(12) United States Patent
Piestun et al.

(10) Patent No.: US 7,705,970 B2
(45) Date of Patent: Apr. 27, 2010

(54) METHOD AND SYSTEM FOR OPTICAL IMAGING AND RANGING

(75) Inventors: Rafael Piestun, Golden, CO (US); Carol J. Cogswell, Boulder, CO (US); Adam D. Greengard, Lafayette, CO (US); Yoav Y. Schechner, Kiriat-Bialik (IL)

(73) Assignee: The Regents of the University of Colorado, Denver, CO (US)

( * ) Notice: Subject to any disclaimer, the term of this patent is extended or adjusted under 35 U.S.C. 154(b) by 42 days.

(21) Appl. No.: 11/758,472

(22) Filed: Jun. 5, 2007

(65) Prior Publication Data

US 2008/0137059 A1    Jun. 12, 2008

Related U.S. Application Data

(60) Provisional application No. 60/803,938, filed on Jun. 5, 2006.

(51) Int. Cl.
G01C 3/08 (2006.01)
(52) U.S. Cl. .................................................. 356/4.01
(58) Field of Classification Search ....... 356/3.01–3.15, 356/4.01–4.1, 5.01–5.15, 6–22, 128, 128.5, 356/139.09, 139.1
See application file for complete search history.

(56) References Cited

U.S. PATENT DOCUMENTS

| | | | |
|---|---|---|---|
| 3,054,898 A | 9/1962 | Westover et al. |
| 3,597,083 A | 8/1971 | Fraser |
| 3,901,595 A | 8/1975 | Helava et al. |
| 3,961,851 A | 6/1976 | Gerharz |
| 4,178,090 A | 12/1979 | Marks et al. |
| 4,573,191 A | 2/1986 | Kidode et al. |
| 4,794,550 A | 12/1988 | Greivenkamp, Jr. |
| 4,825,263 A | 4/1989 | Desjardins et al. |
| 4,843,631 A | 6/1989 | Steinpichler et al. |
| 5,076,687 A | 12/1991 | Adelson |
| 5,102,223 A | 4/1992 | Uesugi et al. |
| 5,193,124 A | 3/1993 | Subbarao |

(Continued)

OTHER PUBLICATIONS

Aguet, François et al., "A Maximum-Likelihood Formalism For Sub-Resolution Axial Localization Of Fluorescent Nanoparticles," Optics Express, vol. 13, No. 26, pp. 10503-10522, Dec. 26, 2005.

(Continued)

*Primary Examiner*—Thomas H Tarcza
*Assistant Examiner*—Luke D Ratcliffe
(74) *Attorney, Agent, or Firm*—Townsend and Townsend and Crew LLP

(57) ABSTRACT

The distance of objects to an optical system is estimated. An optical mask such as a diffractive optical element, continuous phase mask, hologram, amplitude mask, or combination thereof is placed within the optics in front of a sensor array such as a CCD, CID or COMAS device. The optical mask encodes the three-dimensional response of the system. The mask is designed to optimize depth estimation, for example, by maximizing Fisher information. A particular implementation creates a point spread function ("PSF") that rotates as a function of the object position. The image or images obtained with different PSFs may be digitally processed to recover both a depth map of the scene and other parameters such as image brightness. The digital processing used to recover the depth map of the object may include deconvolution of a PSF from detected images.

28 Claims, 4 Drawing Sheets

U.S. PATENT DOCUMENTS

| | | | |
|---|---|---|---|
| 5,243,351 | A | 9/1993 | Rafanelli et al. |
| 5,337,181 | A | 8/1994 | Kelly |
| 5,521,695 | A * | 5/1996 | Cathey et al. ............... 356/4.01 |
| 6,344,893 | B1 * | 2/2002 | Mendlovic et al. .......... 356/3.14 |
| 6,969,003 | B2 * | 11/2005 | Havens et al. ........... 235/462.22 |
| 2003/0061035 | A1 * | 3/2003 | Kadambe ..................... 704/203 |
| 2005/0057744 | A1 * | 3/2005 | Pohle et al. ............. 356/139.03 |
| 2007/0268366 | A1 * | 11/2007 | Raskar et al. ................ 348/143 |

OTHER PUBLICATIONS

Chasles, F. et al., "Full-Field Optical Sectioning And Three-Dimensional Localization Of Fluorescent Particles Using Focal Plane Modulation," Optics Letters, vol. 31, No. 9, pp. 1274-1276, May 1, 2006.

Dowski, Jr., Edward R. et al., "Single-Lens Single-Image Incoherent Passive-Ranging Systems," Applied Optics, vol. 33, No. 29, pp. 6762-6773, Oct. 10, 1994.

Greengard, Adam et al., "Depth From Diffracted Rotation," Optics Letters, vol. 31, No. 2, pp. 181-183, Jan. 15, 2006.

Greengard, Adam et al., "Depth From Rotating Point Spread Functions," Proceedings of SPIE, vol. 5557, pp. 91-97, 2004.

Greengard, Adam et al., "Fisher Information Of 3D Rotating Point Spread Functions," Computational Optical Sensing And Imaging Presentation, 31 pages, Jun. 6, 2005.

Johnson, Gregory E. et al., "Passive Ranging Through Wave-Front Coding: Information And Application," Applied Optics, vol. 39, No. 11, pp. 1700-1710, Apr. 10, 2000.

Kao, H. Pin et al., "Tracking Of Single Fluorescent Particles In Three Dimensions: Use of Cylindrical Optics To Encode Particle Position," Biophysical Journal, vol. 67, pp. 1291-1300, Sep. 1994.

Pentland, Alex Paul, "A New Sense For Depth Of Field," IEEE Transactions On Pattern Analysis and Machine Intelligence, vol. PAMI-9, No. 4, pp. 523-531, Jul. 1987.

Piestun, Rafael et al., "Wave Fields In Three Dimensions: Analysis And Synthesis," J. Opt. Soc. Am. A., vol. 13, No. 9, pp. 1837-1848, Sep. 1996.

Sirat, Gabriel Y., "Conoscopic Holography. I. Basic Principles And Physical Basis," J. Opt. Soc. Am. A, vol. 9, No. 1, pp. 70-83, Jan. 1992.

Subbarao, Murali et al., "Analysis Of Defocused Image Data For 3D Shape Recovery Using A Regularization Technique," SPIE, vol. 3204, pp. 24-35, 1997.

* cited by examiner

METHOD AND SYSTEM FOR OPTICAL IMAGING AND RANGING

CROSS-REFERENCES TO RELATED APPLICATIONS

This application is a non-provisional, and claims the benefit, of commonly assigned U.S. Provisional Application No. 60/803,938, filed Jun. 5, 2006, entitled "Method And System For Passive Optical Imaging And Ranging," the entirety of which is herein incorporated by reference for all purposes.

BACKGROUND OF THE INVENTION

This application relates generally to optical imaging. More specifically, this application relates to methods and systems for optical imaging and ranging.

In most situations, when dealing with recovering the three-dimensional structure of an object or a scene, the objects are opaque. Such is the case when viewing everyday objects such as a tool or a person. There are usually two variables of interest at each image pixel: the surface brightness (reflectance), and its distance from the camera (depth). These two variables (per pixel) are commonly recovered based on two input images.

There are several known methods to solve the problem of ranging and imaging. These include a variety of techniques for stereo imaging or triangulation in which the images are taken from different viewpoints. By measuring the disparity between the positions of corresponding image points, the distance of the corresponding object point is determined. One specific approach is described in U.S. Pat. No. 4,573,191, filed Mar. 29, 1984, entitled "Stereoscopic Vision System," the entirety of which is herein incorporated by reference for all purposes.

Another approach is based on defocus blur. The image of an in-focus object point will be sharp while the image of a defocused object point will be blurred. The depth estimate of object points can be based on focus sensing with multiple images. This method is called depth from focus.

On the other hand, a more efficient approach is to estimate depth by comparing just two images taken with different settings of the imaging system. This method is termed depth from defocus. Using depth of field (DOF) cues, such as focus and defocus, are also preferable over stereo due to the higher numerical apertures used. This allows smaller diffraction problems and ultimately higher depth resolution. Nevertheless, diffraction limits the depth resolution when classical apertures are used. The depth resolution is determined by the DOF, which is a range of depths for which the blur kernel has no detectable change. Therefore, objects within the DOF will be assigned the same depth and no variations will be detected. This happens at the plane of focus, where the kernel changes slowly (quadratically) as a function of depth due to diffraction. Certain specific techniques are described in A. P. Pentland, "A New Sense For Depth Of Field," IEEE Transactions on Pattern Analysis and Machine Intelligence, 9, 523 (1987), and M. Subbarao and Y. Liu, "Analysis Of Defocused Image Data For 3D Shape Recovery Using A Regularization Technique," Proc. SPIE 3204, 24 (1997), the entirety of each of which is herein incorporated by reference for all purposes.

Still other methods for ranging use wavefront encoding as described in U.S. Pat. No. 5,521,695, filed Jun. 23, 1993, entitled "Range Estimation Apparatus And Method," the entirety of which is herein incorporated by reference for all purposes.

None of these methods can achieve super-resolution beyond the depth of field, which is limited by the numerical aperture of the system. There is, accordingly, a need in the art for improved methods and systems for ranging and imaging.

BRIEF SUMMARY OF THE INVENTION

A method and system are described to estimate the distance of objects to the system with extreme accuracy. The system can provide as byproducts the object brightness and the transverse position of objects within the field of view.

A system for estimating a distance to an object is disclosed according to one embodiment of the invention. The system may include an imaging system, a sensor array and one or masks disposed within the imaging system in front of the sensor array. The sensor array is set up to receive one or more images of the object through the imaging system. The one or more masks may be configured to encode one or more three-dimensional responses of the imaging system for calculating a point spread function that evolves as a function of a position of the object.

The mask may be designed to maximize and/or optimize Fisher information. The system may also include recovering a plurality of images of the object with the sensor array and calculating a deconvolution of the plurality of images. The deconvolution may be regularized. The plurality of images may be recovered sequentially or simultaneously. At least two of the images may be recovered from two different masks.

A method for estimating a distance to an object is disclosed according to one embodiment of the invention. The method includes detecting light from the object through an imaging system at a sensor array. The imaging system may include a mask disposed in front of the sensor array and configured to encode a rotating point spread function. The rotating point spread function associated with the mask is deconvolved from light detected at the sensor array and the distance of the object is estimated using the deconvolved rotating point spread function (PSF). In one embodiment, the angle of rotation of the deconvolved rotating point spread function is used to estimate the distance of the object. In another embodiment, the object distance is estimated using an estimation scheme such as a maximum likelihood estimation, a maximum a-posteriori estimation, a Bayesian estimation, and/or other estimation schemes.

Deconvolving the PSF may include detecting a rotating PSF image and a reference image of the object using a sensor array. The reference image may be detected through an optical imaging system employing a standard PSF or a rotating PSF. The PSF is then estimated from the rotating PSF, the reference PSF, a rotating optical transfer function associated with the imaging system employing the rotating point spread function, and a reference optical transfer function associated with the imaging system employing the reference point spread function. In one embodiment, this estimation may use the following equation:

$$\hat{h}_{rot}(\psi) = F^{-1}\left\{\frac{I_{ref}^*}{|I_{ref}|^2 + \sigma^2} I_{rot} H_{ref}\right\},$$

where $F^{-1}$ is the inverse Fourier transform operator, $I_{ref}^*$ is the complex conjugate of the Fourier transform of the reference image, $I_{ref}$ is the Fourier transform of the reference image, $\sigma$ is a regularization parameter, $I_{rot}$ is the Fourier transform of the rotating PSF image, and $H_{ref}$ is the optical transfer function of the reference point spread function.

The distance of the object in reference to the optical system may be estimated from the angle of rotation of the deconvolved point spread function. In one embodiment of the invention, the location of the two largest local maxima of the deconvolved rotating point spread function are estimated. Once these maxima are estimated, the center of each of these local maxima are found and then the angle between the maxima is calculated. In another embodiment, the angle of rotation of the deconvolved rotating point spread function is compared with a calibration curve that relates rotation to depth. In another embodiment, the depth associated with angle of rotation of the deconvolved rotating point spread function is calculated using the following function:

$$\hat{z}'_{obj} = \left( \frac{z_0 \tan\frac{\phi}{2}}{z_{img}^2} + \frac{1}{z_{obj}^{focus}} \right)^{-1},$$

where $z_0$ is the Rayleigh range of the basic Gauss-Laguerre beam that generated the rotating point spread function, $\phi$ is the angle of rotation of the deconvolved rotating point spread function, and $z_{img}$ is the distance to an in-focus image plane of the imaging system.

An imaging system for estimating a distance to an object is also disclosed according to another embodiment of the invention. The imaging system may include at least a sensor array, a mask, and computational logic. The mask may be disposed within the imaging system in front of the sensor array and encoded with a three-dimensional response of the imaging system corresponding with a rotating point spread function that evolves as a function of the distance to the object. The sensor array may be configured to detect at least a rotating PSF image of the object and a reference image of the object, where the rotating PSF image is an image detected through the mask with the rotating PSF. The computational logic may be configured to receive images recorded by the imaging system and compute the distance to the object. The computational logic may perform any of the methods embodied by the various embodiments of the invention. For example, the computational logic may estimate the distance to the object in relation to the imaging system by deconvolution of the rotating point spread function of the imaging system from at least the rotating PSF image and estimating the distance to the object from the rotating point spread function of the imaging system.

The mask used in the imaging system may maximize Fisher information and/or may be statically or dynamically changed. The mask may also comprise a diffractive optical element, a continuous phase mask, a hologram, a computer generated hologram, an amplitude mask, a kinoform and/or a combination thereof. The sensor array may comprise a CCD, CID, and CMOS device.

In one embodiment of the invention, the computational logic may further estimate the angle of rotation of the deconvolved rotating point spread function and the distance to the object from the angle of rotation of the deconvolved rotating point spread function. In another embodiment of the invention, the distance of the object is estimated using an estimation scheme such as a maximum likelihood estimation, a maximum a-posteriori estimation, a Bayesian estimation, and/or other estimation schemes. Computational logic may include a processor or microprocessor. The computational logic may process software stored in memory.

A method for estimating a distance to an object with an imaging system employing a rotating point spread function is also disclosed according to another embodiment of the invention. The method may include detecting a rotating PSF image of the object from the imaging system and deconvolving the rotating point spread function of the imaging system from at least the rotating PSF image. The deconvolution returns a deconvolved rotating point spread function. The angle of rotation is then estimated from the deconvolved rotating point spread function. From the angle of rotation the distance to the object may be estimated. Finally, the distance to the object is returned.

A method for deconvolving a rotating point spread function is also disclosed according to another embodiment of the invention. The method may include detecting a rotating PSF image and a reference image. The rotational image is an image detected through an optical imaging system employing a mask with a rotating PSF. The reference image may be detected through an optical imaging system employing a standard point spread function and/or an optical PSF. The PSF is then estimated from the rotating PSF image, the reference image, a rotating optical transfer function associated with the imaging system employing the rotating PSF, and a reference optical transfer function associated with the imaging system employing the reference PSF. Finally, the PSF is returned.

The PSF may be estimated using the following:

$$\hat{h}_{rot}(\psi) = F^{-1}\left\{ \frac{I^*_{ref}}{|I_{ref}|^2 + \sigma^2} I_{rot} H_{ref} \right\},$$

where $F^{-1}$ is the inverse Fourier transform operator, $I_{ref}^*$ is the complex conjugate of the Fourier transform of the reference image, $I_{ref}$ is the Fourier transform of the reference image, $\sigma$ is a regularization parameter, $I_{ref}$ is the Fourier transform of the rotating PSF image, and $H_{ref}$ is the optical transfer function of the reference point spread function.

The distance of objects to an optical system may be estimated in conjunction (if so desired) with other parameters such as the object brightness and object transverse position. An optical mask such as a diffractive optical element, continuous phase mask, hologram, or amplitude mask is placed within the optics in front of a sensor array such as a CCD, CID, or CMOS device. The optical mask encodes the three-dimensional response of the system. The mask is designed to optimize depth estimation, for example, by maximizing Fisher information. A particular implementation creates a point spread function ("PSF") that rotates as a function of the object position. The image or images are digitally processed to recover both a depth map of the scene and other parameters such as image brightness. The task of the digital process is to implement an estimation algorithm selected from a variety of methods according to system tradeoffs between processing time and estimate accuracy. The system and method provide depth resolution beyond the depth-of-field limit imposed by the numerical aperture of the system.

Variations of the method include multi-channel and single-channel systems, various degrees of coherence and frequency content of the illumination source, different wavelength of electromagnetic waves and different types of waves.

DETAILED DESCRIPTION OF THE INVENTION

In one embodiment of the invention, methods and systems are provided for optical imaging and ranging based on engineering the point spread function ("PSF") to achieve enhanced performance in the task of depth estimation. The PSF is optimized to enhance the discrimination of depth by reducing the uncertainty in depth estimation after an inversion algorithm performed in a (typically digital) computer. Physical design and postprocessing (or inversion) algorithms are matched to the specific task of depth estimation. Therefore, the PSF is optimized with respect to a mathematical measure such as Fisher information. However, other measures of good depth discrimination, such as mutual information or entropy among optical intensity distributions in depth, are also possible.

This principle can be applied to visible optical radiation, infrared or ultraviolet. It can also be used for any other electromagnetic radiation such as microwaves or radio waves. Moreover, it can be used with other types of waves such as ultrasound, seismic waves, etc.

In particular, three-dimensional ("3D") PSFs whose transverse cross sections rotate with respect to each other as a result of diffraction in free space provide enhanced depth discrimination relative to clear aperture PSFs or Gaussian beams. Rotating PSFs provide a faster rate of change with depth than PSFs of clear pupil systems having the same numerical aperture ("NA"). The system works with spatially incoherent quasi-monochromatic illumination. Extension to broadband illumination can be performed with achromatization techniques. Spatially coherent illumination can also be used with minor modifications. Moreover, both active and passive illumination systems may be used.

Figure 1A:
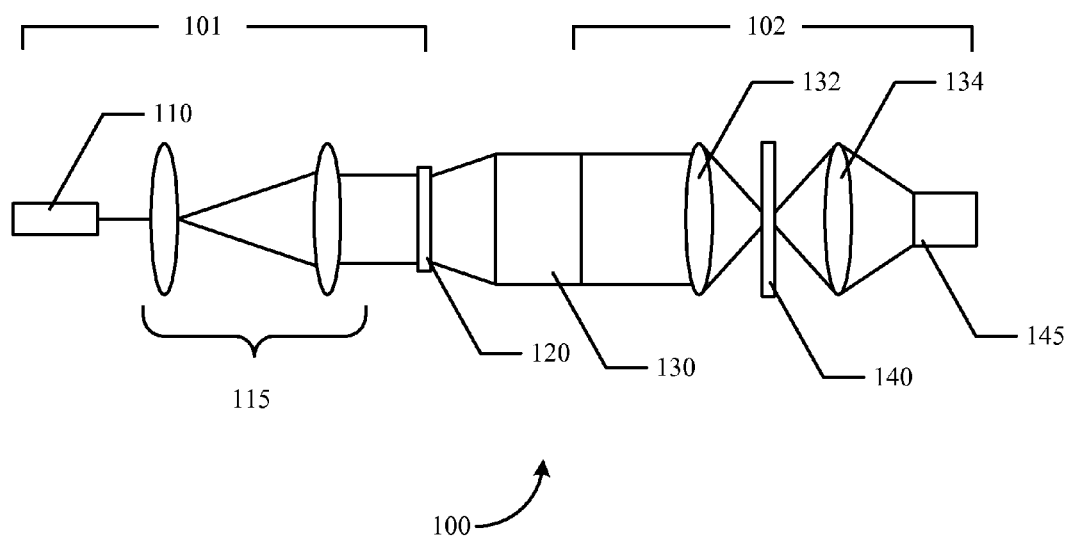
FIG. 1A shows an exemplary block diagram of an illumination and imaging system according to one embodiment of the invention.

FIG. 1A shows an exemplary block diagram 100 of an illumination subsystem 101 and an imaging subsystem 102 according to one embodiment of the invention. As shown in the block diagram, this exemplary system illuminates an object 130 with an illumination subsystem 101 and images the object 130 with an imaging system 102. Those skilled in the art will recognize other subsystems that perform the same or similar functions as the imaging 102 and illumination 101 subsystems may be used.

The illumination subsystem 101 includes a coherent light source 110. The coherent light source 110 may include, for example, an Argon Ion laser operating at 514 nm or an He—Ne laser operating at 633 nm. Other lasers operating at various wavelengths may also be used to produce coherent light. The coherent light source may produce monochromatic, quasi-monochromatic, and/or polychromatic light. The coherent light from the coherent light source is then made spatially incoherent using a telescope 115 and a rotating diffuser 120. The telescope 115, as shown, may include a series of lenses and/or optical elements that expand the coherent light.

The rotational diffuser may be configured to redistribute the intensity profile of light from the coherent light source 110 to another intensity profile, such as a more uniform spatially incoherent or partially coherent intensity profile. The rotational axis of the rotating diffuser 120 may be parallel with or offset from the optical access of the illumination subsystem 101. The rotating diffuser 120 may rotate fast enough to complete one rotation during the integration time of the imager 145. In other embodiments, the rotating diffuser may rotate faster than the integration time of the imager 145.

Those skilled in the art will recognize that other illumination subsystems 101 that produce noncoherent light on an object 130 may also be used. Light sources, optics, diffusers, and/or other optical elements may be combined to illuminate the object 130 with noncoherent light. Moreover, other embodiments of the invention may use coherent light sources to illuminate the object 130.

The imaging system 102, as shown in FIG. 1, implements two lenses 132, 134 with a mask 140 positioned in between. The lenses 132,134 focus light from the image 130 onto an imager 145. The lenses 132, 134, for example, may comprise optical lenses with 200 mm focal lengths and an 11 mm aperture, thereby providing a numerical aperture of 0.0275. As another example, the lenses may have 500 mm and 250 mm focal lengths with an 11 mm aperture, thereby providing a numerical aperture of 0.0147. Of course, various other lenses and/or optical elements may be included in the imaging subsystem 102 in order to focus light from the object onto the imager 145.

The mask 140 may be positioned at the Fourier plane of the imagining subsystem. The mask 140 may include a phase mask, a hologram, a shaped aperture, a computer generated hologram, a diffractive optical element, a kinoform, or any other similar device (herein referred to as "the mask"). The point spread function may include a transfer function in both amplitude and phase. Moreover, the mask may comprise a plate of laser-etched glass. It can also be static or dynamically changed, for example, with a spatial light modulator such as those using liquid crystals, electro-optic modulation, microfluidics, or micro-electro-mechanical systems. It can also adapt to changing situations by changing the PSF to changing scenes, system requirements, or user requirements. For longer wavelengths, antenna arrays can be used, while for ultrasound, arrays of transducers are appropriate.

The mask 140, for example, may also include a computer generated hologram (CGH) that reconstructs a point spread function (PSF), at least, in the first order. The CGH may include a plate of laser-etched glass. The CGH may also be binary, that is, it may include only two phase levels. In some embodiments, the system may require an efficient CGH. For instance, during illumination from the illumination subsystem, loss of light may be significant, especially using a diffuser. Therefore any optical loss at the CGH may only compound optical loss from the illumination subsystem 101.

The PSF can be implemented with a phase mask, a hologram, a shaped aperture, a diffractive optical element, a kinoform, a combination thereof and/or any other similar device (herein referred to as "the mask"). It can also be static or dynamically changed, for example, with a spatial light modulator such as those using liquid crystals, electro-optic modulation, microfluidics, or micro-electro-mechanical systems. It can also adapt to changing situations by changing the PSF to changing scenes, system requirements, or user requirements. For longer wavelengths, antenna arrays can be used, while for ultrasound, arrays of transducers are appropriate.

The mask can be located in different positions within the imaging subsystem 102. For example, it can be located in what is known as the Fourier plane or in the back focal plane of the imaging lens. But other locations are possible, including the possibility of implementing all of the functions (including lensing) within the mask or vice versa.

Figure 1B:
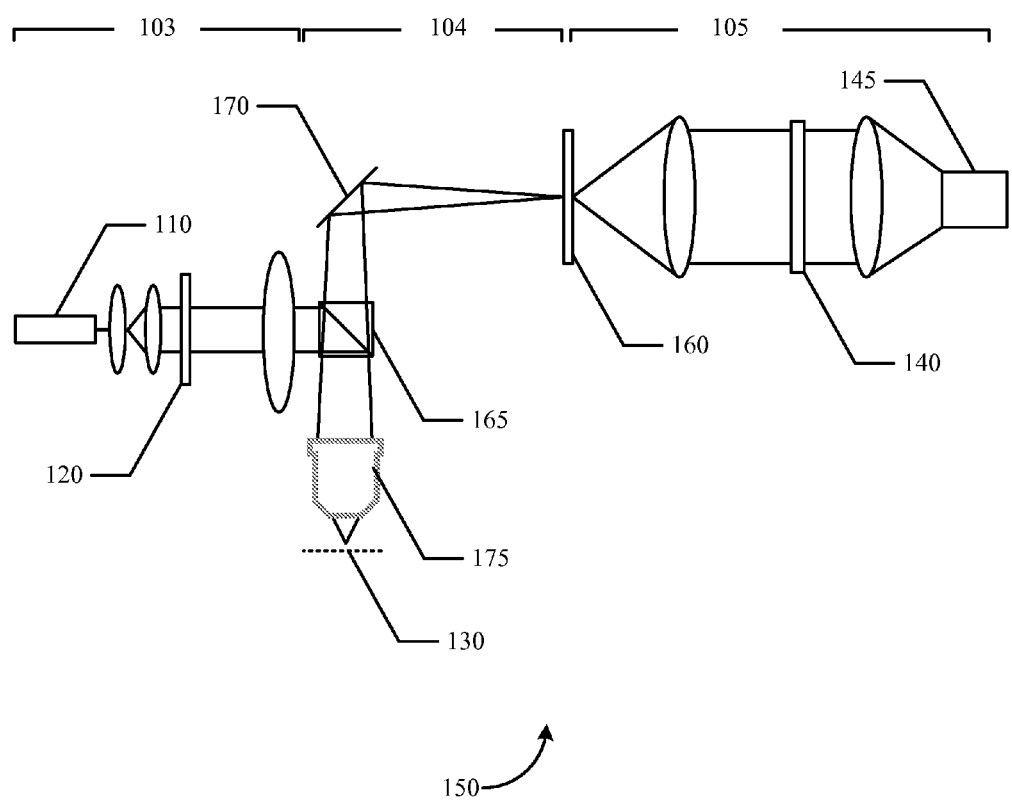
FIG. 1B shows an exemplary block diagram of an illumination, microscopy, and imaging system according to one embodiment of the invention.

FIG. 1B shows an exemplary block diagram 150 of microscopy embodiment of the invention. This embodiment incorporates a reflection rather than a transmission optical system. As shown in the block diagram, this exemplary system illuminates an object 130 with an illumination subsystem 103, and images the object 130 with an imaging system 105. A microscopy subsystem 104 is also included. The microscopy subsystem 104 places an image of the object 130 within the microscope image plane 160. Such an exemplary system may also include a rotating diffuser 120 and various optical elements that take the coherent light from the coherent light source 110 and spread and diffuse the light. The microscopy subsystem 104 may include a beam splitter 165, an objective, and/or a mirror 170. The imaging subsystem 105 is similar to the imaging subsystem shown in FIG. 1A and includes a mask 140 and two optical elements focusing the light on imager 145.

There is an infinite number of rotating PSFs that may be used and multiple ways of implementing them. Accordingly, no single rotating PSF is required by the systems and methods of the present invention. As an example, one can use a rotating PSF generated as a superposition of Laguerre-Gaussian modes with indices (m, n) equal to (1, 1), (3, 5), (5, 9), (7, 13), and (9, 17), where the indices are defined by a Gaussian-Laguerre modal plane. The indices also obey the following relationship n=|m|+2i, where i is an integer. This PSF is designed to produce a rotation of almost π within the range of interest. Beyond this range, the PSF continues to rotate while expanding.

Figure 2A:
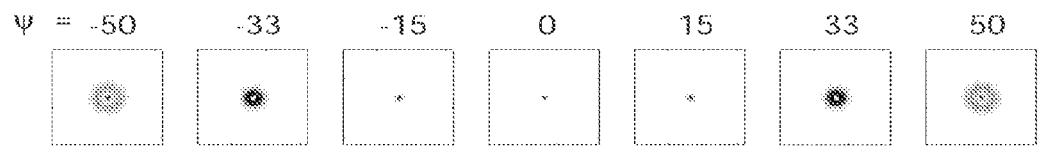
FIGS. 2A and 2B show a standard PSF and a rotating PSF, respectively, for various values of defocus according to one embodiment of the invention.
Figure 2B:
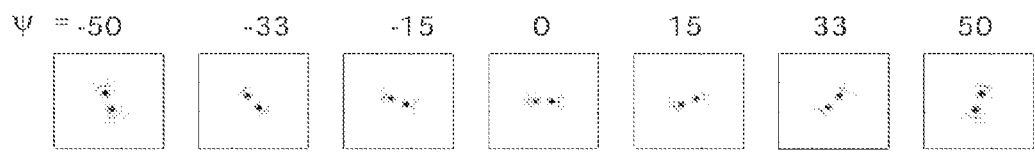

FIG. 2A shows a standard (non-rotating) PSF for various values of defocus. Note that the standard PSF is symmetric about 0 defocus. Both positive and negative defocus produce the same results. FIG. 2B, on the other hand, shows a rotating PSF through various values of defocus according to one embodiment of the invention. The rotating PSF used in FIG. 2B was generated as a superposition of Laguerre-Gaussian modes as described above. Note that the rotating PSF shows greater change from one value of defocus to the next. The rotating PSF can detect changes in positive and negative defocus as well.

The benefits of a rotating PSF can also be shown by comparing the Fisher Information of a rotating PSF with a standard PSF. A plot of normalized Fisher Information for various values of defocus show that a rotating PSF provides an order of magnitude more information regarding defocus than a standard PSF. Also, such a plot shows that the Fisher Information for a rotating PSF is reasonably constant over a region of interest in contrast to a standard PSF. Thus, certain areas of defocus are similarly favored in a rotating PSF. Defocus can be quantified by the defocus parameter ψ defined as:

$$\psi = \frac{2\pi}{\lambda}\left(\frac{1}{z_{obj}^{focus}} - \frac{1}{z'_{obj}}\right)r^2, \quad (1)$$

where λ is the wavelength of light, $z_{obj}^{focus}$ and $z'_{obj}$ are the in-focus and actual object distances from the entrance pupil, respectively, and r is the radius of the exit pupil that defines the numerical aperture of the system.

For a general object and shift-invariant system, the detected image $i_{rot}$ is proportional to the convolution of the object intensity distribution I and the depth-dependent transverse PSF $h_{rot}(\psi)$. One step in estimating depth is to recover this transverse PSF by use of two frames and a deconvolution algorithm. Two images may be used to make the depth-from-defocus estimation well posed. Hence, in addition to $i_{rot}$, a reference frame $i_{ref}$ is acquired. Advantageously, a reference may, thus, be used that is least sensitive to defocus while being relatively sharp throughout the range of interest. In the following example, the reference frame is acquired by stopping down the aperture of the standard system to half that of the rotating PSF system. The two frames may be acquired in parallel or sequentially.

The rotating PSF $h_{rot}$ may be estimated by deconvolution as:

$$\hat{h}_{rot}(\psi) = \quad (2)$$
$$F^{-1}\{H_{rot}(\psi)\} = F^{-1}\left\{\frac{I_{rot}}{I_{ref}}H_{ref}\right\} = F^{-1}\left\{\frac{I \cdot H_{rot}(\psi)}{I \cdot H_{ref}}H_{ref}\right\},$$

where F denotes Fourier transform while I=Fi, $I_{rot}$=Fi$_{rot}$, and $I_{ref}$=Fi$_{ref}$. The quantities $H_{rot}$ and $H_{ref}$ are respectively the optical transfer functions of the rotating and the reference PSFs. Both $H_{rot}$ and $H_{ref}$ can be precomputed or calibrated.

Because deconvolution is ill-conditioned, it may be regularized. In one embodiment, the solution is regularized by computing:

$$\hat{h}_{rot}(\psi) = F^{-1}\left\{\frac{I^*_{ref}}{|I_{ref}|^2 + \sigma^2}I_{rot}H_{ref}\right\} \quad (3)$$

instead of Eq. (2), where σ is a regularization parameter. Once the PSF is recovered, the depth may be estimated by measuring the angle of rotation of the transverse PSF. The spot size of this PSF may also be estimated, as is done with traditional depth-from-defocus. The estimated depth $\hat{z}$ is related to the angle of rotation as:

$$\hat{z}'_{obj} = \left(\frac{z_0 \tan\frac{\phi}{2}}{z_{img}^2} + \frac{1}{z_{obj}^{focus}}\right)^{-1}, \quad (4)$$

where $z_0$ is the Rayleigh range of the basic Gauss-Laguerre beam that generates the PSF, φ is the angle of rotation, and $z_{img}$ is the distance to the in-focus image plane. The accuracy of the relation between depth and rotation angle may be improved by calibration of the system. The depth is, thus, estimated by recovering the PSF, measuring its orientation φ, and then using the calibration curve that relates rotation to depth. In an alternative embodiment, other estimation algorithms may be used, for example, a maximum likelihood estimation, a maximum a-posteriori estimation, and/or Bayesian estimation.

In further embodiments, only one image frame in the system is used and the deconvolution is performed among all the possible rotations of the point spread function. A similar procedure as the one described above leads to the depth estimation.

In another embodiment of the invention, the CGH may have a requisite separation distance between images created by the PSF. Each order of the CGH can be viewed as creating a distinct PSF separated in space. The light from the object 130 is convoluted with each of the distinct PSF, creating a series of images separated in space. In some embodiments, these images must be separated in space without overlap. Separation distance can be estimated from the following equation called the space bandwidth product:

$$d_{sep} = f_{ref} \lambda f. \tag{5}$$

As can be seen from this equation, the separation distance of the images is a function of the hologram reference frequency, $f_{ref}$, the wavelength of light, $\lambda$, and the focal length of the lens placed after the hologram, f. The separation distance may be increased by increasing either the reference frequency, $f_{ref}$, and/or the focal length, f.

Increasing the focal length, f however, may cause the PSF to scale larger which can cause the transfer function to scale smaller and then lead to a lower frequency cutoff and/or decreased resolution. By setting the space bandwidth resolution at least as large as the physical size of the imager 145, these potential competing constraints can be balanced. Another way of looking at it is by noting that the space-bandwidth product of the hologram 130 is equal to the number of fringes on the hologram and the space-bandwidth of the imager 145 is equal to the number of pixels. Accordingly, the hologram 130 may be set to have as many fringes as pixels in the imager 145.

The above illustration applies to shift-invariant systems. It will be evident to those of skill in the art how to extend the methods and systems to shift-variant systems after reading this disclosure. In particular, in applying the principles described above for shift variant systems, the response of the system is not represented by a convolution but rather by an integral equation that represents the response of the system. The condition of maximization of a mathematical measure in depth remains valid as a design criterion and can be applied in this case as well. The reconstruction uses a deblurring algorithm rather than a deconvolution algorithm. Several techniques for deblurring are known to those of skill in the art.

In the illustrative embodiment described above, the system uses two channels. The two PSFs can be jointly optimized to achieve the depth estimation task. Multiple channels can be implemented in alternative embodiments to improve the performance of the system in terms of accuracy. Deblurring algorithms for multi-channel systems exist in the literature and can be adapted to this task with optimized PSFs. A single channel system presents the simplest physical implementation and can be appropriate for depth estimation in certain applications. In particular, it is attractive for situations where there is some previous information regarding the scene. For example, such situations arise when the scene is mostly composed of small bright objects that act as point sources. In microscopy, this would apply to beads.

Figure 3:
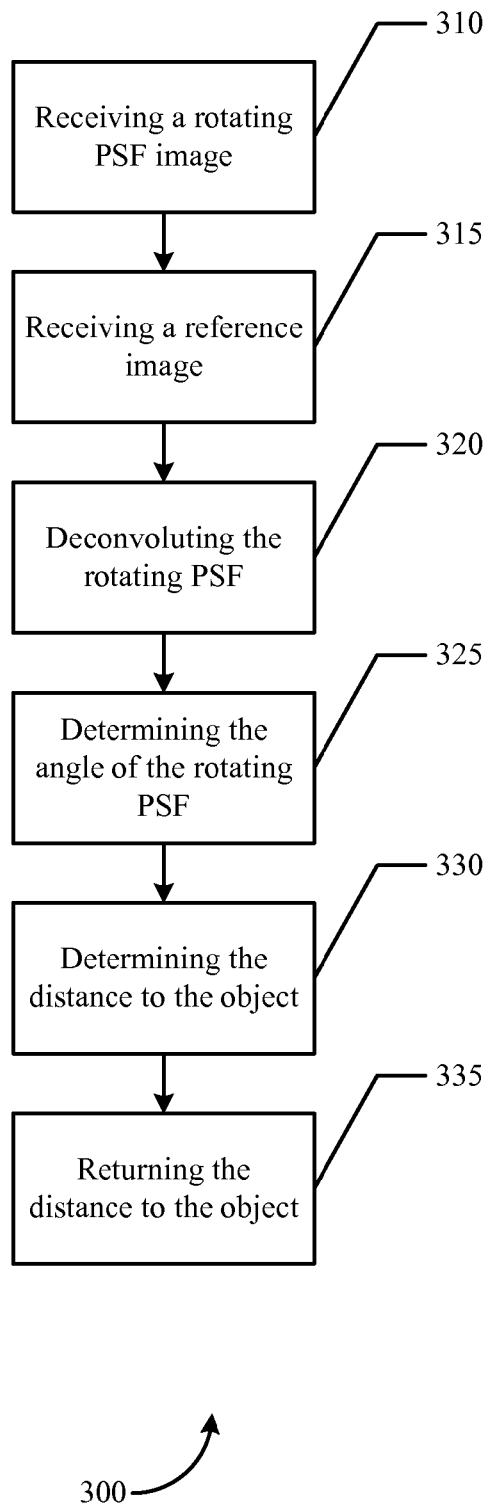
FIG. 3 shows a flowchart of a method for determining the distance of an object using a rotating PSF according to one embodiment of the invention.

FIG. 3 shows a flowchart outlining a method of estimating the distance of an object using a rotating PSF 300 according to another embodiment of the present invention. While a number of steps are shown in the flowchart, the method is not limited to these steps. Steps may be added or subtracted from what is shown in the figure. Moreover, steps may be rearranged and may occur in various orders not described or shown.

A rotating and reference image is received at blocks 310, 315. For example, these images may be received from a camera, such as a CCD, CID, or CMOS device. The images may also be received that are imaged by a third party device or by a coupled system. The images may be operated on by various filters and/or cleaning algorithms. The images may also be calibration images, theoretical images, and/or test images.

The images may then be used to deconvolute the rotating PSF using the rotating and reference images at block 320. Deconvolution may proceed using equations 2 and/or 3 discussed above. Moreover, rather than using a standard image, the reference image may be a rotating PSF image at a different angle of defocus.

Once the rotating PSF is estimated, the angle of the rotating PSF may be estimated at block 325. The angle may be calculated by finding the two largest local maxima of the deconvolved PSF. These two maxima correspond to the intensity peaks in the rotating PSF. The center of the two maxima may then be computed and the angle between the two estimated. This angle may be used in equation 4 to determine the distance to the object as shown in block 330. The distance is then returned to a user at block 335.

When a scene contains objects at multiple or different depths, the same principle can be used by estimating the depth and/or distances of each patch of the scene and/or image. The scene can be divided in a set of zones or patches with the same depth. Different methods permit one to attain this goal. In one such method, a sliding window is scanned throughout the scene to determine the smallest window in a given location that provides a single and consistent depth result. The method for scanning the window and its size can be changed adaptively according to the system needs and according to a measure of confidence of the result. In general, the window is larger than the resolution of the raw image and can have any shape or size. A procedure could also start with large windows to obtain a coarse depth map and continue with a smaller window to obtain a finer depth map. Various other subdividing schemes may also be employed to measure the depth and/or distance of multiple objects within a single scene and/or image.

The method in FIG. 3 may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. Memory may also be used to store the software and/or operative data.

Furthermore, the embodiment shown in FIG. 3 and any derivation thereof may be implemented by hardware, software, scripting languages, firmware, middleware, microcode, hardware description languages, and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein, the term "memory" refers to any type of long term, short term, volatile, nonvolatile, or other storage medium and is not to be limited to any particular type of memory or number of memories, or type of media upon which memory is stored.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

While certain embodiments of the invention are aimed at estimating depth or range, the system including PSF and algorithm can be optimized to jointly estimate additional parameters such as 2D location and brightness of an object. For example, the maximum likelihood method, the maximum a-posteriori estimation, a Bayesian estimation, and/or other estimation scheme can be used to determine the transverse position of an object within a scene. The PSF can be designed not only to increase the discrimination in depth but also to increase the discrimination of the object to transverse shifts. Moreover, the brightness of the object, i.e., a gray level or color image, can be obtained from the raw data as a by-product of the PSF processing process. In all these cases, the physical system and the algorithms are adapted to the task at hand (depth/brightness/position estimation).

As a further embodiment of the system, a multi-channel system can be implemented to achieve different degrees of depth estimation from coarse to finer. A multi-channel system includes more than one sensor array. In some embodiments, these sensor arrays may detect the object through various different optical elements. For example, each channel may use a different mask, optical element, lens, and/or sensor array. Such a system can be implemented in parallel or sequentially with dynamically updated PSFs.

Merely by way of illustration, potential applications include military ranging systems for acquiring information in the battlefield, computer/internet immersive reality games, cell phone telepresence, microscopy, robotics, machine vision, space optics, outer space telescopes, automotive, camera auto focus, microscopy, localization of objects in 3D, radar, ladar, microwave and other EM areas of the spectrum, other waves like ultrasound.

Further applicability of the various embodiments of the invention may include scanning techniques using rotating beams that do and do not require axial scanning. For example: scanning microscopes, 3D object reconstruction systems, and adaptive ranging systems, where the scanning beam can be redirected towards different objects or parts of the same object. Embodiments of the invention may extend to three dimensional location of micro-articles and/or nano-particles (including fluorescent and scattering particles). The embodiments of the invention may apply to algorithms for 3D parallel imaging with at least two images.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A system for estimating a distance to an object, the system comprising:
   an imaging system;
   a sensor array, wherein the sensor array is disposed to receive one or more images of the object through the imaging system;
   a one or more masks disposed within the imaging system in front of the sensor array, the one or more masks being configured to encode one or more three-dimensional responses of the imaging system for calculating a three dimensional point spread function that evolves as a function of a position of the object.

2. The system recited in claim 1, wherein the mask maximizes Fisher information.

3. The system recited in claim 1, wherein the mask optimizes Fisher information.

4. The system recited in claim 1, further comprising:
   recovering a plurality of images of the object with the sensor array; and
   calculating a deconvolution of the plurality of images.

5. The system recited in claim 4, wherein recovering the plurality of images of the object comprises recovering the plurality of images sequentially.

6. The system recited in claim 4, wherein recovering the plurality of images of the object comprises recovering the plurality of images substantially simultaneously.

7. The system recited in claim 4, wherein at least two of the plurality of images are recovered from different masks.

8. The system recited in claim 4, further comprising regularizing the deconvolution.

9. A method for estimating a distance to an object, the method comprising:
   detecting light from the object through an imaging system at a sensor array, the imaging system including a first mask disposed in front of the sensor array and encoded with a first point spread function and a second mask disposed in front of the sensor array and encoded with a second point spread function, wherein either or both of the first point spread function and the second point spread function comprises a three dimensional point spread function that evolves as a function of a position of the object;
   receiving a first image of the object through the first mask;
   receiving a second image of the object through the second mask;
   calculating a deconvolution of the first image and the second image; and
   estimating the distance of the object using the deconvolved of the first image and the second image.

10. The method according to claim 9, further comprising estimating the angle of rotation of the deconvolution of the first image and the second image.

11. The method according to claim 9, wherein the distance of the object is estimated using an estimation scheme selected from the group consisting of a maximum likelihood estimation, a maximum a-posteriori estimation, and a Bayesian estimation.

12. The method according to claim 9, wherein the calculating a deconvolution of the first image and the second image comprises estimating the point spread function from the first image, the second image, a first optical transfer function associated with the first point spread function, and a second optical transfer function associated with the second point spread function.

13. The method according to claim 9, wherein the estimating the point spread function comprises calculating the point spread function from the following equation:

$$\hat{h}_{rot}(\psi) = F^{-1}\left\{\frac{I^*_{first}}{|I_{second}|^2 + \sigma^2}I_{first}H_{second}\right\}.$$

14. The method according to claim 10, wherein the estimating the angle of rotation of the deconvolution of the first image and the second image comprises:
  estimating the location of the two largest local maxima of the deconvolution first image and the second image;
  estimating the center of the two largest local maxima; and
  estimating the angle of rotation between the center of the two largest local maxima.

15. The method according to claim 10, wherein the estimating the distance to the object from the angle of rotation of the deconvolved rotating point spread function comprises:
  comparing the angle of rotation of the deconvolution of the first image and the second image with a calibration curve that relates rotation to depth; and
  estimating the depth associated with the angle of rotation of the deconvolution of the first image and the second image.

16. The method according to claim 15, wherein the estimating the depth associated with angle of rotation of the deconvolved rotating point spread function is calculated using the following function:

$$\hat{z}'_{obj} = \left(\frac{z_0\tan\frac{\phi}{2}}{z^2_{img}} + \frac{1}{z^{focus}_{obj}}\right)^{-1}.$$

17. The method recited in claim 9, further comprising estimating a brightness of the object from one of the first point spread function or the second point spread function.

18. The method recited in claim 12, further comprising estimating a brightness of the object from one of the first point spread function or the second point spread function.

19. An imaging system for estimating a distance to an object, the system comprising:
  a sensor array;
  a mask disposed within the imaging system in front of the sensor array, the mask encoded with a three-dimensional response of the imaging system corresponding with a rotating point spread function that evolves as a function of the distance to the object; and
  computational logic configured to receive images recorded by the imaging system and compute the distance to the object, wherein the distance to the object is calculated by deconvolution of the rotating point spread function of the imaging system from at least the rotating PSF image, and estimating the distance to the object from the rotating point spread function of the imaging system.

20. The system recited in claim 19, wherein the computational logic is configured to:
  estimate the angle of rotation of the deconvolved rotating point spread function; and
  estimate the distance to the object from the ange of rotation of the deconvolved rotating point spread function.

21. The system recited in claim 19, wherein the computational logic is configured to estimate the distance of the object using an estimation scheme selected from the group consisting of a maximum likelihood estimation, a maximum a-posteriori estimation, and a Bayesian estimation.

22. The system recited in claim 19, wherein the mask maximizes Fisher information.

23. The system recited in claim 19, wherein the mask is adapted to be statically or dynamically changed.

24. The system recited in claim 19, wherein the mask is a computer generated hologram.

25. The system recited in claim 19, wherein the mask is selected from the group consisting of a diffractive optical element, a continuous phase mask, a hologram, an amplitude mask, a kinoform, and a combination thereof.

26. The system recited in claim 19, wherein the imaging system is an optical system.

27. The system recited in claim 19, wherein the sensor array is selected from the group consisting of a CCD, CID, and CMOS device.

28. A method for estimating a distance to an object with an imaging system employing a rotating point spread function, the method comprising:
  detecting a rotating PSF image of the object from the imaging system;
  deconvolving the rotating point spread function of the imaging system from at least the rotating PSF image, wherein the deconvolution returns a deconvolved rotating point spread function;
  estimating the angle of rotation of the deconvolved rotating point spread function;
  estimating the distance to the object from the angle of rotation of the deconvolved rotating point spread function; and
  returning the distance to the object.

* * * * *

UNITED STATES PATENT AND TRADEMARK OFFICE
CERTIFICATE OF CORRECTION

PATENT NO. : 7,705,970 B2
APPLICATION NO. : 11/758472
DATED : April 27, 2010
INVENTOR(S) : Rafael Piestun et al.

It is certified that error appears in the above-identified patent and that said Letters Patent is hereby corrected as shown below:

Cover page, item (73), Assignee, after "The Regents of the University of Colorado, Denver, CO (US)" add --The Technion Research and Development Foundation, Ltd., Haifa, Israel (IL)--

Cover page, item (57), Abstract, line 5, delete "COMAS" and insert --CMOS--

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,705,970 B2
APPLICATION NO. : 11/758472
DATED : April 27, 2010
INVENTOR(S) : Rafael Piestun et al.

Page 1 of 1

It is certified that error appears in the above-identified patent and that said Letters Patent is hereby corrected as shown below:

Column 1, lines 12-13, in between the PRIORITY INFORMATION and BACKGROUND Sections, please insert the following:

-- This invention was made with federal government support under NSF Grant No. NSF 0225533. The government has certain rights in the invention. --

Signed and Sealed this
Nineteenth Day of March, 2013

Teresa Stanek Rea
*Acting Director of the United States Patent and Trademark Office*